(12) United States Patent
Morohashi (10) Patent No.: US 8,510,574 B2
(45) Date of Patent: Aug. 13, 2013

(54) NETWORK APPARATUS AND COMMUNICATION CONTROLLING METHOD

(75) Inventor: Takeo Morohashi, Yokohama (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 336 days.

(21) Appl. No.: 12/705,689

(22) Filed: Feb. 15, 2010

(65) Prior Publication Data

US 2010/0211788 A1 Aug. 19, 2010

(30) Foreign Application Priority Data

Feb. 17, 2009 (JP) ................................. 2009-033766

(51) Int. Cl.
*G06F 12/14* (2006.01)

(52) U.S. Cl.
USPC ........................... 713/193; 713/170; 358/1.14

(58) Field of Classification Search
USPC ......... 713/150, 151, 1, 2, 300, 310, 324–340, 713/168–170, 193; 726/2
See application file for complete search history.

(56) References Cited

U.S. PATENT DOCUMENTS

| | | | | |
|---|---|---|---|---|
| 2002/0140973 | A1* | 10/2002 | Imaizumi et al. | 358/1.15 |
| 2002/0141580 | A1* | 10/2002 | Okuyama | 380/201 |
| 2003/0237003 | A1* | 12/2003 | Rautiainen et al. | 713/201 |
| 2006/0095768 | A1* | 5/2006 | Hoshino et al. | 713/168 |
| 2007/0257813 | A1* | 11/2007 | Vaswani et al. | 340/870.02 |

FOREIGN PATENT DOCUMENTS

| | | |
|---|---|---|
| GB | 2 389 282 | 12/2003 |
| JP | 64-074561 | 3/1989 |
| JP | 06-291813 | 10/1994 |
| JP | 10-105296 | 4/1998 |
| JP | 2003-204349 A | 7/2003 |
| JP | 2005-20215 A | 1/2005 |
| JP | 2005-234859 | 9/2005 |
| JP | 2006-352500 | 12/2006 |
| WO | WO 2005/112283 | 11/2005 |

OTHER PUBLICATIONS

Office Action (Notice of Reasons for Refusal) dated Dec. 8, 2010, issued in the corresponding Japanese Patent Application No. 2009-033766, and an English Translation thereof.
"IPSec SA Delete in "dangling" implementation" Retrieved from the Internet: URL:http://www.vpnc.org/ietf-ipsec/msg02116.html, Dec. 1, 1999, pp. 1-2, XP002638088.
Search Report dated Jun. 21, 2011, issued in the corresponding European Patent Application No. 10152412.2-1244.
Office Action (Examiner's Decision of Refusal) dated Feb. 25, 2011, issued in the corresponding Japanese Patent Application No. 2009-033766, and an English Translation thereof.

* cited by examiner

*Primary Examiner* — Nirav B Patel
(74) *Attorney, Agent, or Firm* — Buchanan Ingersoll & Rooney PC (57) ABSTRACT

Disclosed is a network apparatuses, which makes it possible to effectively re-establish the cryptographic communication without increasing its processing burden and deteriorating the security aspects of them. The network apparatus that communicates with another network apparatus through a network to exchange cryptographic communication information including a key of cryptograph transmits, when a power off sequence is detected, a request for deleting the cryptographic communication information to the other network apparatus through a communication interface section, before a power source section is turned OFF so as to actually deactivate the network apparatus.

13 Claims, 7 Drawing Sheets

CONFIGURATION OF NIC

FIG. 3b

STRUCTURAL ELEMENTS OF IPSEC

FIG. 4

SA CONTROLLING DATABASE

| SPI (SECURITY POINTER INDEX) SERVING AS SA IDENTIFICATION INFORMATION | DESTINATION ADDRESS | SA (INCLUDING CRYPTOGRAPHIC COMMUNICATION INFORMATION AND KEY OF CRYPTOGRAPH) |
|---|---|---|
|  |  |  |
|  |  |  |
|  |  |  |

NETWORK APPARATUS AND COMMUNICATION CONTROLLING METHOD

This application is based on Japanese Patent Application No. 2009-033766 filed on Feb. 17, 2009, with Japan Patent Office, the entire content of which is hereby incorporated by reference.

BACKGROUND OF THE INVENTION

The present invention relates to a network apparatus and a communication controlling method, and specifically relates to a network apparatus, a power source of which is turned ON or OFF in a normal operating mode, and a communication controlling method to be employed in the network apparatus concerned, at the sequence time when the power source is turned OFF.

In order to safely conduct communications in a certain network system while maintaining security aspects of the communications, a cryptographic communication method, in which encrypted data are bilaterally communicated between the apparatuses in the network concerned, has been employed in the network system. In such the cryptographic communication method, both nodes to be communicated with each other create a key for encryption/decryption processing, and exchange and/or commonly own information being necessary for the cryptographic communication to be conducted between them, such as a key information, a term of validity, etc., (hereinafter, referred to as cryptographic communication information), so as to establish the communication between them.

In this connection, when the cryptographic communication is conducted between a network apparatus "A" and another network apparatus "B", in the event that the cryptographic communication information, owned by the network apparatus "B" currently serving as a receiver of the encrypted data sent from the network apparatus "A", has been lost due to an operation for rebooting the network apparatus "B", caused by an occurrence of a certain malfunction, the network apparatus "A" has no means for recognizing the fact that the network apparatus "B" has lost the cryptographic communication information. For this reason, the network apparatus "A" would continue to transmit the encrypted data to the network apparatus "B" until the term of validity has elapsed, but the encrypted data received by the network apparatus "B" will be abandoned without being decrypted, since the network apparatus "B" cannot decrypt it due to a lack of the cryptographic communication information.

To cope with abovementioned problem, although it may be possible to store the cryptographic communication information in advance into a certain nonvolatile storage medium, such as an HDD (Hard Disc Drive), etc., the risk of leaking the information is heightened to a high level, and accordingly, this method does not comply with the original object for protecting the security aspect of the communication between them, and therefore, is not desirable as the solution of the abovementioned problem.

Under the abovementioned background, so far, there have been proposed various kinds of recovery methods to be employed in the event that the cryptographic communication information has been lost. For instance, Tokkai 2005-20215 and Tokkai 2003-204349 (both are Japanese Patent Application Laid-Open Publications) set forth methods for conducting an operation for notifying the other party of an occurrence of a certain malfunction after the rebooting operation has completed, when the certain malfunction occurred.

It is assumed in the prior art of Tokkai 2005-20215 and Tokkai 2003-204349 that the objective network apparatus is always activated during the normal operating time. However, such a network apparatus that consumes a large amount of electric power or whose operation frequency fluctuates widely, has been operated in such a manner that its power source is turned OFF when the network apparatus is not actually used, while its power source is turned ON only when the network apparatus is actually used, as its normal operating mode. Accordingly, in such the network apparatus abovementioned, the rebooting operation is conducted not only in case of an occurrence of certain malfunction, but also every time when its power source is turned ON.

Therefore, in the network apparatus abovementioned, every time when its power source is turned OFF, it becomes impossible to restore the communication until the term of validity has elapsed. In addition, there has been such a problem that, every time when its power source is turned OFF, unnecessary encrypted data are transmitted through the network until the next rebooting operation (turning its power source ON) is conducted, resulting in not only an increase of the burden for the cryptographic communication processing to be conducted in the other party, but also an increase of the load of the network concerned.

Further, if the method disclosed in Tokkai 2005-20215 or Tokkai 2003-204349 is employed for the network apparatus abovementioned, it becomes necessary to send the malfunction notification to the other party every time when the rebooting operation is conducted, and this makes the processing complicated and cumbersome. Still further, according to the conventional method abovementioned, since it is also necessary to store a part of the cryptographic communication information, there has been another problem that the security aspect of the encrypted data has been deteriorated.

SUMMARY

To overcome the abovementioned drawbacks in conventional network apparatuses, it is one of objects of the present invention to provide a network apparatuses and a communication controlling method, each of which makes it possible to effectively restore the cryptographic communication, while preventing the network apparatus and the network from increasing its processing burden and deteriorating the security aspects of them.

Accordingly, at least one of the objects of the present invention can be attained by the network apparatuses described as follows.

(1) According to a first network apparatus reflecting one aspect of the present invention, which is used in a network system in which the first network apparatus communicates with a second network apparatus through a network to exchange cryptographic communication information including a key of cryptograph with the second network apparatus, so that the first and second network apparatuses respectively store the cryptographic communication information therein to perform cryptographic communication therebetween based on the cryptographic communication information, the first network apparatus comprises: a power source section to supply electric power so as to activate the network apparatus; a communication interface section that is coupled to the network so as to transmit the cryptographic communication information to the other network apparatus through the network; and a power OFF detecting section to detect a power OFF sequence; wherein, in response to the detecting the power OFF sequence by the power off detecting section, the communication interface transmits a request for deleting the cryptographic communication information to the second network apparatus before the power source section is turned OFF so as to actually deactivate the first network apparatus.

(2) According to another aspect of the present invention, in the first network apparatus recited in item (1), the power OFF detecting section determines that the power OFF sequence is started when at least one of the following timings is detected: a first timing when an NMI (Non Maskable Interrupt) signal is received; a second timing when an output voltage of the power source section becomes equal to or lower than a prescribed threshold value; a third timing when it is detected that a power switch cover is opened; a forth timing when settings of the network apparatus are changed; and a fifth timing when an operation for rewriting a firmware of the network apparatus has completed.

(3) According to still another aspect of the present invention, in the first network apparatus recited in item (1), the cryptographic communication is defined as an IPsec (Security Architecture for Internet Protocol) communication, while the cryptographic communication information is defined as SA (Security Association) information.

(4) According to yet another aspect of the present invention, in the first network apparatus recited in item (1), the request is issued by the power off detecting section in response to the detection of the power off sequence, and the communication interface transmits the request issued by the power off detecting section.

(5) According to still another aspect of the present invention, in the network apparatus recited in the item (1), the cryptographic communication is defined as an IPsec (Security Architecture for Internet Protocol) communication, while the cryptographic communication information is defined as SA (Security Association) information.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 3a shows a block diagram indicating a configuration of an NIC (Network Interface Card), while

DETAILED DESCRIPTION OF THE PREFERRED EMBODIMENT

The IPsec (Security Architecture for Internet Protocol) has been employed as the framework of the cryptographic communication.

The IPsec is such a protocol that is employed for encrypting an IP packet of the TCP/IP (Transmission Control Protocol/Internet Protocol) and exchanging the encrypted IP packet between the nodes currently conducting the communication. According to the IPsec, the IKE (Internet Key Exchange) processing is conducted and the cryptographic communication information (hereinafter, also referred to as SA (Security Association) information) is exchanged between the nodes, so as to commonly own the SA information and to establish the communication between the nodes concerned. The SA information includes various kinds of parameters being necessary for the cryptographic communication, such as an address, an authenticating algorism to be employed, an encryption algorism, a key of cryptograph, a term of validity, etc. Since the SA information is transmittable only in a unilateral direction, it is necessary to provide two sets of SA information, respectively serving as a transmission use and a receiving use.

Even in such the communicating operation that employs the IPsec as abovementioned, when the rebooting operation is implemented in the network apparatus "B" serving as a receiver of the encrypted data, due to an occurrence of a certain event, such as an occurrence of apparatus malfunction, an operation for turning OFF the power souse, a setting change, etc., and accordingly, when the SA information has lost due to occurrence of such the event, the network apparatus "A" continues to transmit the IP packet encrypted on the basis of the SA information, until the term of its validity has elapsed.

As one of methods for recovering the cryptographic communication when the SA information has lost, there has been employed such a method that the network apparatus "A" starts to apply the IKE processing to the network apparatus "B" just after the term of validity of the concerned SA information has elapsed, so as to reestablish the SA information, and then, waits the recovery of the communication between them. However, for instance, since the term of validity of SA information is set at 3600 seconds in the XP/Vista of the Windows (Registered Trademark) as its default value, according to the above-mentioned method, the communication between them is shut out during the abovementioned term of validity, resulting in a loss of the communication term.

Further, as another one of methods for recovering the cryptographic communication when the SA information has lost, the method for rebooting the network apparatus "A" may be employed. However, when the network apparatus "A" currently serves as a server and/or a router, there would be a possibility that the rebooting operation would adversary affect the communications with the other network apparatuses, also resulting in a loss of the communication.

Still further, the afore-cited Tokkai 2005-20215 sets forth such the method that, when a certain malfunction has occurred, an operation for notifying the IPsec apparatus, currently communicated with by referring to the contents of the cache storage, of the occurrence of the malfunction, is implemented, after the rebooting operation has been completed. Still further, the afore-cited Tokkai 2003-204349 sets forth such the method that a part of the SA information is stored in advance into the nonvolatile storage medium as the SA controlling information, and after the rebooting operation has been completed, at the time when the IPsec packet is received, the IPsec packet is collated with the SA controlling information, so that, when the both are coincide with each other, an operation for notifying the other apparatus of the fact that the key of cryptograph has been lost, is implemented.

According to the method set forth in Tokkai 2005-20215 or Tokkai 2003-204349 abovementioned, however, since the operation for notifying the other party of the occurrence of the malfunction should be implemented every time when the rebooting operation is conducted, the processing becomes complicated as a whole, and further, since a part of the SA information is stored in advance into the nonvolatile storage medium, there arises such a problem that the security aspect of the concerned communication system is deteriorated.

To overcome the abovementioned drawback in the conventional systems, the system exemplary embodied in the present invention is so constituted that the network apparatus, in which the sequential procedure for turning OFF the power source has commenced, transmits a request for deleting the cryptographic communication information (SA information when the communication based on the IPsec is currently implemented) before the power source has been actually deactivated.

Concretely speaking, the network apparatus is provided with a power OFF detecting section, so that, when detecting the commencement of the sequential procedure for turning OFF the power source, the power OFF detecting section transmits a deletion command for deleting the cryptographic communication information to the other network apparatus serving as the other site currently communicated with, before the cryptographic communication information is lost by turning OFF the power source. Receiving the deletion command, the other network apparatus serving as the other site deletes the cryptographic communication information concerned and deactivates the operation for transmitting the packet. After that, when the network apparatus, serving as the sender of the deletion command, resumes the power ON status and its rebooting operation has been completed, the both parties again exchange the cryptographic communication information with each other, so as to commonly own the cryptographic communication information and to establish the communication between the nodes concerned.

According to the abovementioned feature of the system exemplary embodied in the present invention, it becomes possible to effectively recovery the cryptographic communication between the nodes without increasing the processing burden of the system and without deteriorating the security aspect of the system concerned.

In this connection, since the network apparatus is normally provided with an HDD (Hard Disc Drive), and therefore, it is necessary to complete various kinds of operations, such as an operation for moving a head of the HDD to a standby position, etc., before the power source is actually turned OFF, a power duration time in a range of 500-800 ms is provided before the power source is actually deactivated. Accordingly, it is possible to transmit the deletion command for deleting the cryptographic communication information to the other node during the power duration time above-mentioned.

Although various aspects of the cryptographic communication in regard to the general purpose network apparatus have been described in the foregoing, among other things over various kinds of network apparatuses, an image forming apparatus, such as an MFP (Multi Function Peripheral), etc., consumes a large amount of electric power to heat up the fixing device, etc., and its using frequency widely fluctuates according to the operating status at that time. Therefore, such the image forming apparatus is usually operated in such a manner that the power source is turned OFF during the non-operating time, while the power source is turned ON (activated) only during the operating time. Further, it becomes necessary for the image forming apparatus to conduct the rebooting operation at the time of changing the machine settings, completing the operation for rewriting the firmware, etc.

As described in the above, other than at the time when a certain malfunction has occurred, the image forming apparatus frequently requires the operations for turning OFF the power source and rebooting its software, compared to a general purpose network apparatus, such as a server, a router, etc. Accordingly, the communication controlling operation to be conducted in the image forming apparatus will be exemplified and detailed in the following as an embodiment of the present invention.

<Embodiment>

Figure 1:
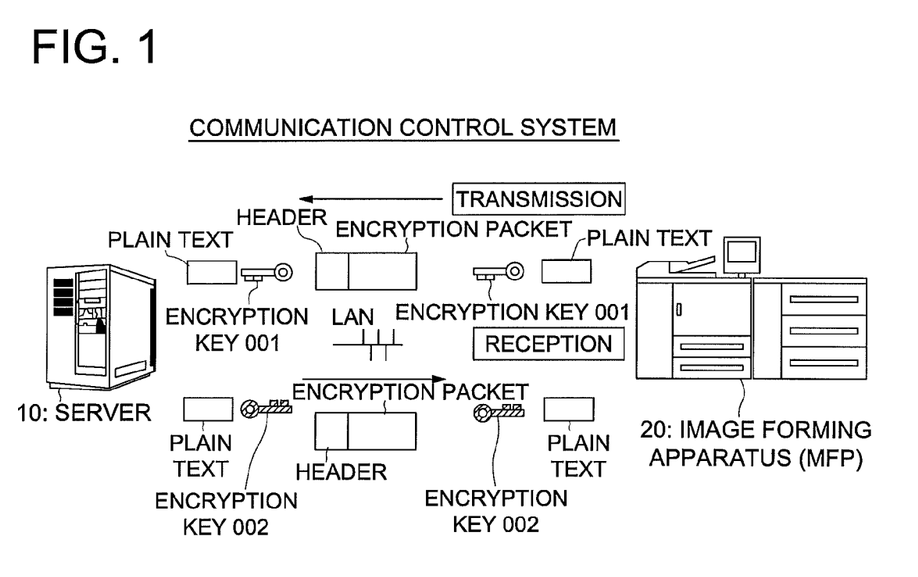
FIG. 1 shows a schematic diagram indicating a configuration of a communication control system and a communication method, embodied in the present invention.
Figure 2:
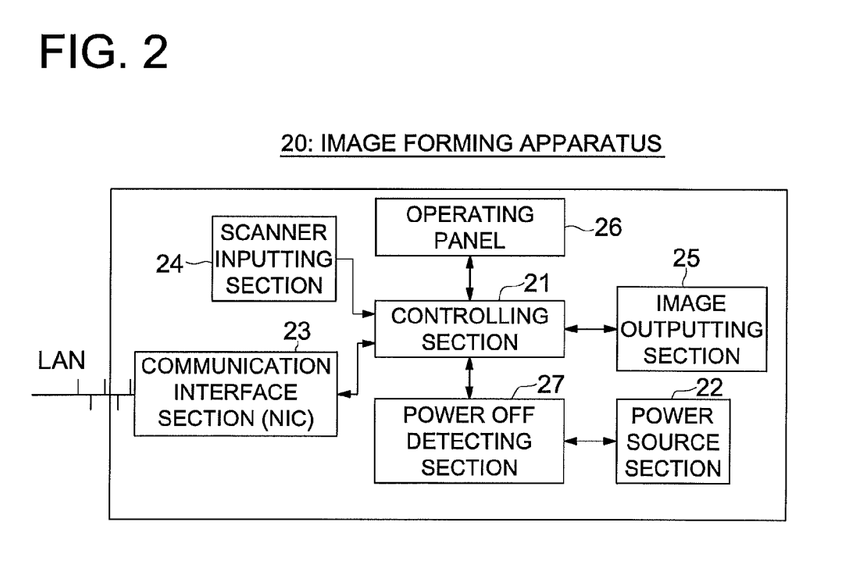
FIG. 2 shows a block diagram indicating a configuration of an image forming apparatus embodied in the present invention.
Figure 3A:
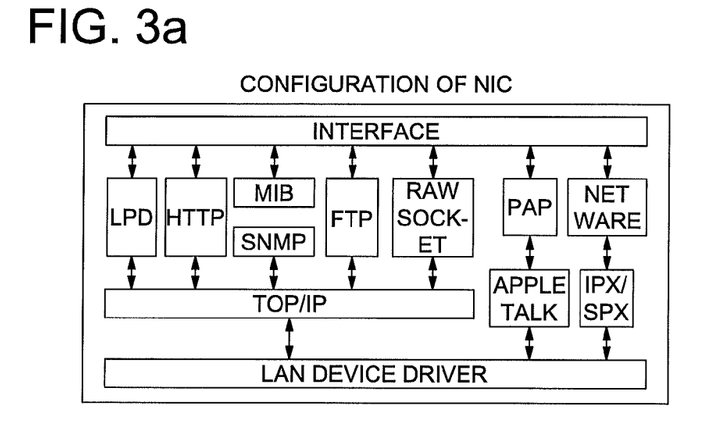
Figure 3B:
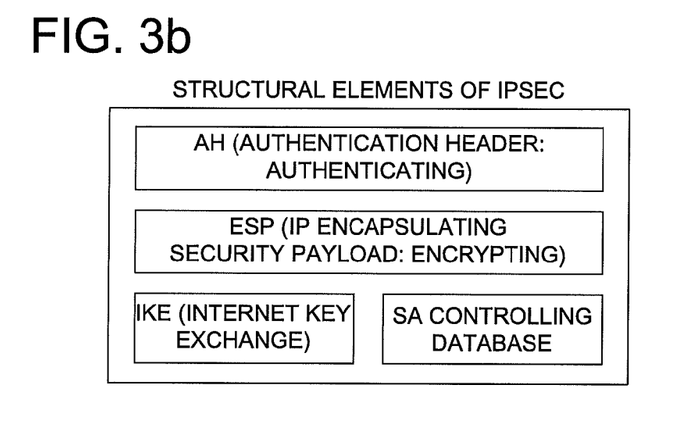
FIG. 3b shows a block diagram indicating structural elements of an IPsec.
Figure 4:
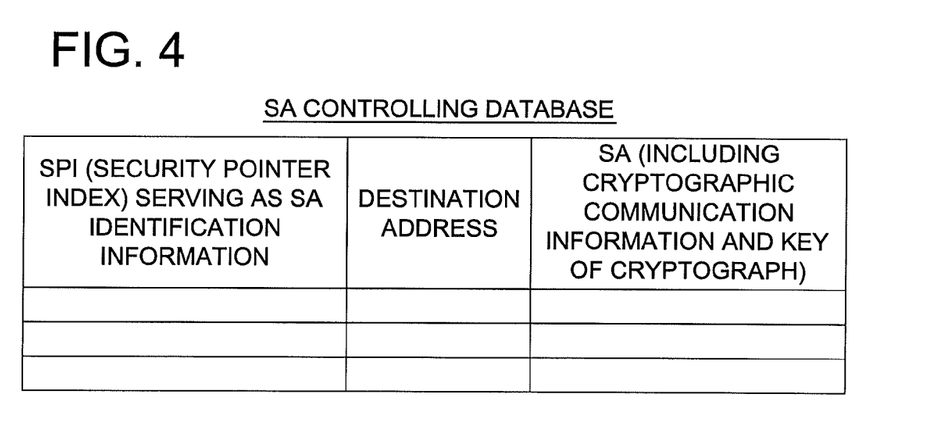
FIG. 4 shows a table indicating an exemplary configuration of a SA controlling database.
Figure 5:
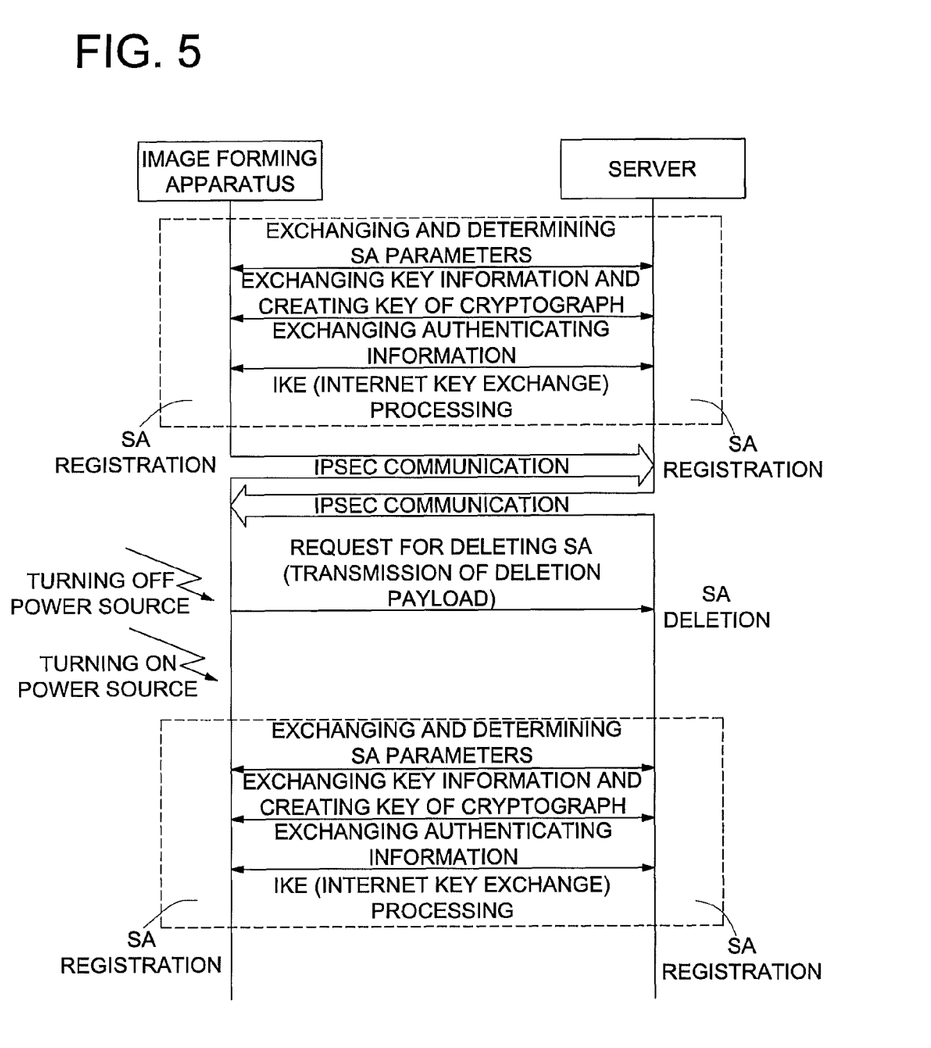
FIG. 5 shows a sequential diagram indicating IPsec communication sequences to be conducted between an image forming apparatus and a server included in a communication controlling system embodied in the present invention.

In order to further describe a preferred embodiment of the present invention in detail, referring to FIG. 1 through FIG. 10, a network apparatus and a communication controlling method, embodied in the present invention, will be detailed in the following. FIG. 1 shows a schematic diagram indicating a configuration of a communication control system embodied in the present invention. Further, FIG. 2 shows a block diagram indicating a configuration of an image forming apparatus embodied in the present invention, FIG. 3*a* shows a block diagram indicating a configuration of the NIC (Network Interface Card) and FIG. 3*b* shows a block diagram indicating structural elements of the IPsec. Still further, FIG. 4 shows a table indicating an exemplary configuration of the SA controlling database and FIG. 5 shows a sequential diagram indicating IPsec communication sequences to be conducted between the image forming apparatus and the server. Yet further, FIG. 6 through FIG. 10 show flowcharts indicating operation procedures of the IPsec communication embodied in the present invention.

As shown in FIG. 1, the communication control system embodied in the present invention serves as a cryptographic communication system that performs operations for transmitting and receiving encrypted packets by employing a key of cryptograph and is constituted by a network apparatus, such as a server, a router, a user terminal device, etc., (hereinafter, defined as a server 10) and another network apparatus (hereinafter, defined as an image forming apparatus 20), both of which are coupled to each other through a communication network, such as an Ethernet (Registered Trademark), a token-ling, a LAN (Local Area Network) or a WAN (Wide Area Network) being conformable with a specification, such as a FDDI (Fiber Distributed Data Interface), etc., etc.

The server 10 includes a controlling section that is constituted by a CPU (Central Processing Unit), a storage device, such as a ROM (Read Only Memory), a RAM (Random Access Memory), etc., an HDD (Hard Disc Drive), etc. (not shown in the drawings). The server 10 conducts the cryptographic communication (hereinafter in this embodiment, defined as the IPsec communication) between the server 10 and the image forming apparatus 20, and, when receiving the deletion command sent from the image forming apparatus 20, the server 10 implements an operation for deleting the cryptographic communication information (hereinafter in this embodiment, defined as the SA information) according to the deletion command received.

On the other hand, as shown in FIG. 2, the image forming apparatus 20 is constituted by a controlling section 21, a power source section 22, a communication interface section 23, a scanner inputting section 24, an image outputting section 25, an operating panel 26, a power OFF detecting section 27, etc.

The controlling section 21 is constituted by a CPU, a storage device, such as a ROM, a RAM, etc., an HDD, etc., which are coupled to each other through a bus, so as to control various kinds of elementary sections provided in the apparatus.

Further, the controlling section 21 also serves as a print controller that applies a RIP (Raster Image Processor) processing to print data, received from the server 10 or the like, so as to create image data for every page (page data), and further applies various kinds of image processing (various kinds of conversion processing in regard to an image size, a resolution, a monochrome or a color image, etc.) and/or a screening processing to the created page data as needed, and then, transfers the processed page data to the image outputting section 25.

The power source section 22 supplies electric powers to the various kinds of sections provided in the image forming apparatus 20, which are respectively turned ON or OFF according to command signals outputted under the controlling operations conducted by the controlling section 21. In this connection, the term of "power OFF state", cited hereinafter in the present specification, is defined as such a state that the electric power supply is deactivated so as to make the communication enter into a disable state caused by deleting the information stored in the RAM. Accordingly, the term of "power OFF state" does not include such a state that the electric power to be supplied to a part of the structural elements is deactivated, and for instance, such the state that the electric power to be supplied to the image outputting section 25 is deactivated should be excluded from the abovementioned definition.

The communication interface section 23 is constituted by a NIC (Network Interface Card), etc. For instance, as shown in FIG. 3a, the NIC is constituted by an Interface to conduct a data transferring operation with the controlling section 21, an LDP (Line Printer Daemon protocol to perform a printing operation through a TCP/IP network), a MIB (Management Information Base serving as information disclosed by a network apparatus controlled by an SNMP), an SNMP (Simple Network Management Protocol to monitor and control a network apparatus through a TCP/IP network), an FTP (File Transfer Protocol to transfer a file through a TCP/IP network), a RAW socket, a PAP (Password Authentication Protocol serving as one of security protocols), an AppleTalk (protocol installed in the Mac OS of Apple Co. as a standard software to implement the network functions), a Netware (network OS of Novell Co.), an IPX/SPX (Internetwork Packet eXchange/Sequenced Packet eXchange being a protocol employed by Netware of Novell Co.), a TCP/IP, a LAN Device Driver, etc. As above-mentioned, the NIC is equipped with a plurality of protocol stacks, such as the TCP/IP, etc., so as to perform the data transferring operation with the controlling section 21 through the interface.

In this connection, the IPsec is included in the TCP/IP protocol stack. Further, as shown in FIG. 3b, the structural elements of the IPsec include an AH (IP Authentication Header: authenticating), an ESP (IP Encapsulating Security Payload: encrypting), an IKE (Internet Key Exchange) and an SA controlling database. As shown in FIG. 4, the abovementioned SA controlling database includes a SPI (Security Pointer Index) serving as SA identification information, a destination address and an SA (Security Association), which are stored into the RAM and deleted from the RAM by turning OFF the power source.

The scanner inputting section 24 optically reads an image residing on a document placed on a document placing plate, so as to generate digital image data representing the image. For this purpose, the scanner inputting section 24 is constituted by a light source to emit a light beam to be scanned on the document, a CCD (Charge Coupled Device) image sensor to convert the light beam reflected from the document to electric signals, an analogue to digital converter to convert the electric signals to the digital image data, etc.

The image outputting section 25 is constituted by various kinds of structural elements being necessary for an image forming process employing the electro-photographic method or the electrostatic recording method, and for instance, constituted by a photoreceptor drum, a transfer belt, a fixing device, various kinds of conveyance belts, a cleaning section, etc., so as to form an image onto a designated paper sheet, based on the page data processed and outputted by the controlling section 21.

The operating panel 26 is constituted by a touch panel, mounted over a display screen section and serving as a pressure sensitive operating section in which transparent electrodes are arranged in a lattice pattern, so as to make it possible to detect X-Y coordinate values of a stress point pressed by a finger or a touch pen as electric values, and to output the detected positional signals to the controlling section 21 as the operational signals.

The power OFF detecting section 27 monitors the sequential process for turning OFF the power source section 22 (power source shut-down operation). When detecting the commencement of the power OFF sequential process, the power OFF detecting section 27 creates the deletion command for requesting the other party to delete the SA information and transmits the above-created deletion command to the network apparatus (server 10 in the present invention), serving as the other communication party, through the communication interface section 23, within an time interval until the power OFF sequential process is completed (in other words, until the electric power to be supplied from the power source is actually shut off).

In this connection, it is applicable that the OFF state of the power switch is detected by employing an NMI (Non Maskable Interrupt) signal outputted from the power source section 22, so as to detect the power OFF sequential process abovementioned. Further, it is also applicable to determine that the power source is turned OFF, when the output voltage currently outputted by the power source becomes equal to or lower than a threshold value established in advance. Still further, it is also applicable to determine that the power source is turned OFF at a specific time, such as when a mechanical cover of the power switch is opened, when machine settings, which requires an operation for rebooting software concerned, have changed, when an operation for rewriting the firmware has completed, etc. Yet further, it is applicable that the power OFF detecting section 27 is configured as either hardware, or software serving as a communication control program, which makes the controlling section 21 of the image forming apparatus 20 serve as the power OFF detecting section 27.

In this connection, the image forming apparatus 20, shown in FIG. 2, is merely one of examples among various variations of image forming apparatuses of the present embodiment. It is applicable that the scanner inputting section 24 is omitted from the configuration, or alternatively, an ADF (Automatic Document Feeder) and/or a post processing section are/is added to the configuration.

Further, although the controlling section 21 also serves as the print controller in the configuration shown in FIG. 2, it is also applicable that the system is so constituted that the print controller is installed into a separate apparatus, which is coupled to the image forming apparatus 20 through a video interface or the like.

Next, referring to the sequential diagram illustrated in FIG. 5, and the flowcharts illustrated in FIGS. 6 through 10, the following is explanation of the communication procedures of the IPsec to be performed between the image forming apparatus 20 and the server 10, both of which are included in the above-configured communication control system.

<Processing at the time of IPsec transmission (processing in upper Area of Sequential Diagram Shown in FIG. 5)>

Figure 6:
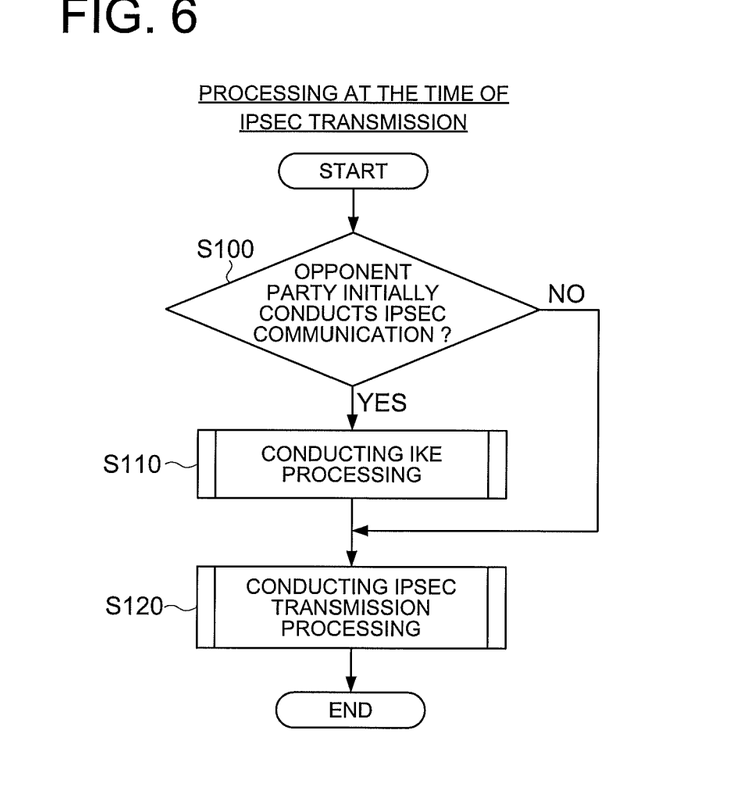
FIG. 6 shows a flowchart indicating an operation procedure to be performed at the time of an IPsec transmission, embodied in the present invention.

Initially, the controlling section 21 (or the communication interface section 23) of the image forming apparatus 20 determines whether or not the other communication party (server 10) that has not yet conducted the IPsec communication with the image forming apparatus (Step S100 in FIG. 6). When it is determined that the other communication party is a party that has not yet conducted the IPsec communication with the image forming apparatus, the controlling section 21 conducts the IKE (Internet Key Exchange) processing with the server 10 (Step S110). Then, the controlling section 21 (or the communication interface section 23) employs the exchanged key to encrypt the data, and transmits the encrypted data to the server 10 (Step S120).

Figure 7:
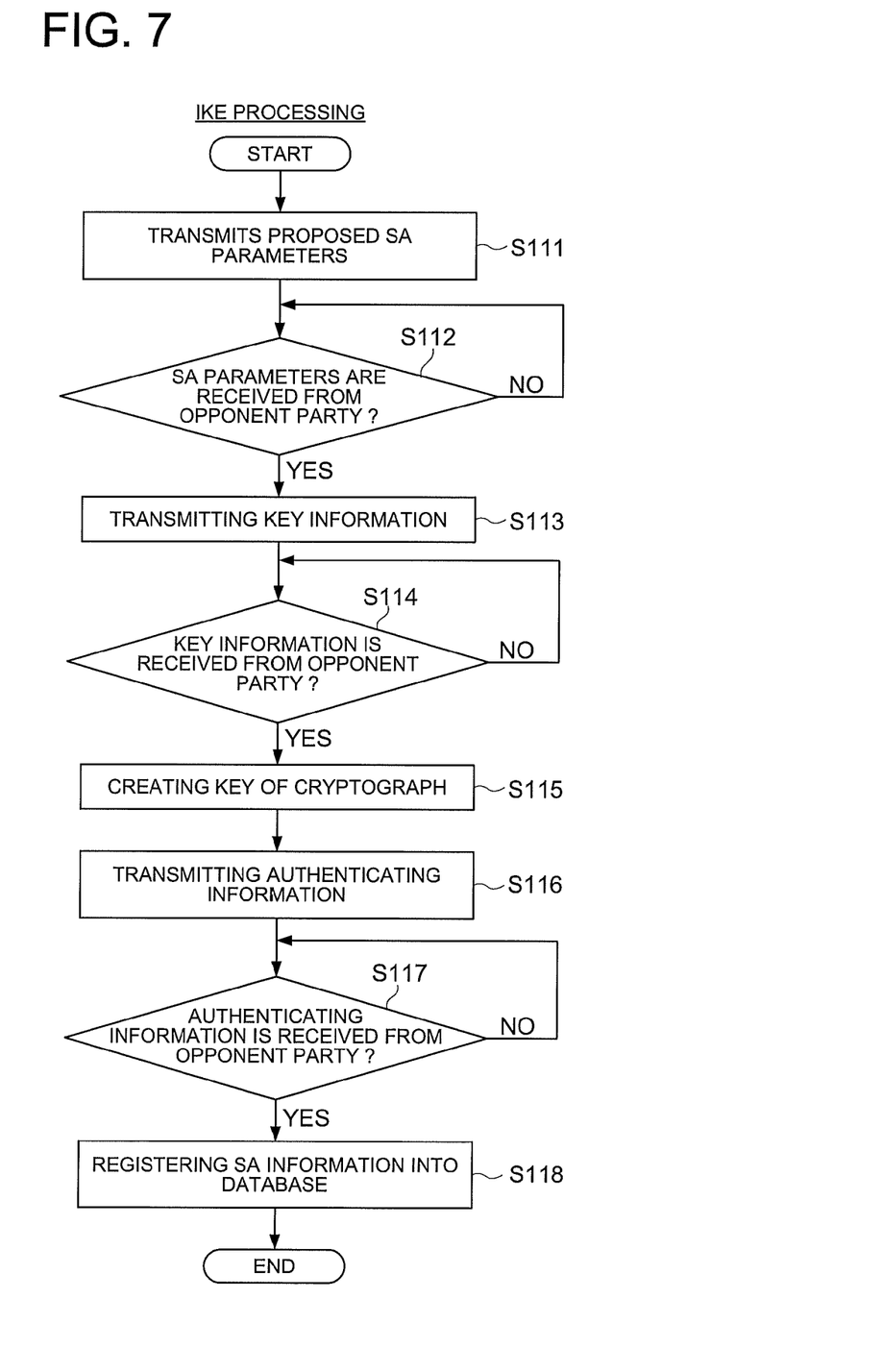
FIG. 7 shows a flowchart indicating another operation procedure to be performed at the time of an IKE processing, embodied in the present invention.

Referring to the flowchart shown in FIG. 7, the IKE (Internet Key Exchange) processing to be conducted in the abovementioned Step S110 will be concretely detailed in the following.

At first, the controlling section 21 of the image forming apparatus 20 transmits the SA (Security Association) parameters to the server 10 (Step S111), and receives the SA parameters from the server 10 (Step S112). Successively, the controlling section 21 transmits own key information to the server 10 (Step S113), and receives server's key information from the server 10 (Step S114). Still successively, the controlling section 21 determines the authenticating algorism and various kinds of parameters, such as the effective term, etc., and then, employs a certain method, for instance, "Diffie-Hellman", to create the key of cryptograph (Step S115), and transmits the authenticating information to the server 10 (Step S116). On the other hand, the server 10 also creates the key of cryptograph, and transmits the authenticating information to the image forming apparatus 20.

Successively, receiving the authenticating information sent from the server 10 (Step S117), the controlling section 21 stores the SA information, the index information (SPI) serving as SA identification information and the destination address into the SA controlling database shown in FIG. 4 (Step S118). In this connection, since the SA information is unilaterally transmissible information, the SA information is controlled as a pair of that for transmitting use and that for receiving use.

Figure 8:
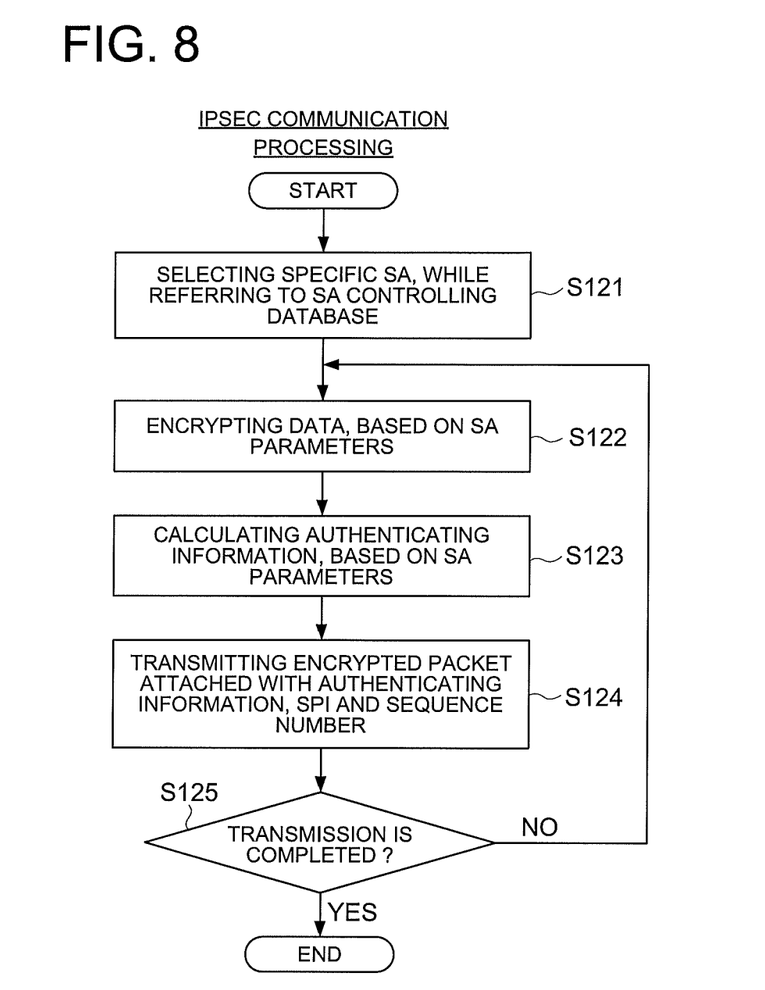
FIG. 8 shows a flowchart indicating still another operation procedure to be performed at the time of an IPsec communication processing, embodied in the present invention.

Next, referring to the flowchart shown in FIG. 8, the IPsec communication processing to be conducted in the abovementioned Step S120 will be concretely detailed in the following.

At first, referring to the SA controlling database, the controlling section 21 selects a specific SA (Step S121). Successively, referring to the specific SA selected in the above, the controlling section 21 selects a specific encryption algorism, and employs the key of cryptograph to encrypt the data, so as to create the encrypted packet (Step S122). Still successively, the controlling section 21 employs the authenticating algorism to calculate the authenticating information (Step S123), and then, transmits the authenticating information calculated in the above, the index information (SPI) serving as SA identification information and a sequence number indicating the packet order to the server 10 (Step S124). Then, the controlling section 21 repeats the processing from Step S122 to Step S124 until the concerned transmitting operation is completed (Step S125).

Successively, based on the index information (SPI) attached to the packet received from the image forming apparatus 20, the server 10 selects the encryption algorism while referring to the concerned SA information, so as to encrypt the encrypted data by employing the concerned key of cryptograph. Still successively, the server 10 selects the authentication algorism while referring to the concerned SA information, in order to check the authenticating information and to confirm the safety of the decrypted data.

For instance, as shown in FIG. 1, the image forming apparatus 20, serving as the transmission side, employs encryption key 001 based on the concerned SA information, for encrypting the packet so as to create the encrypted packet, and then, describes the SPI onto the SPI field to transmits the IP packet concerned. On the other hand, the server 10, serving as the reception side, finds the corresponding SA information from the SPI described onto the SPI field of the header, and employs encryption key 001 based on the corresponding SA information to decrypt the encrypted packet.

<Processing at the Time when Power Off Status is Detected (Processing in Middle Area of Sequential Diagram Shown in FIG. 5)>

Figure 9:
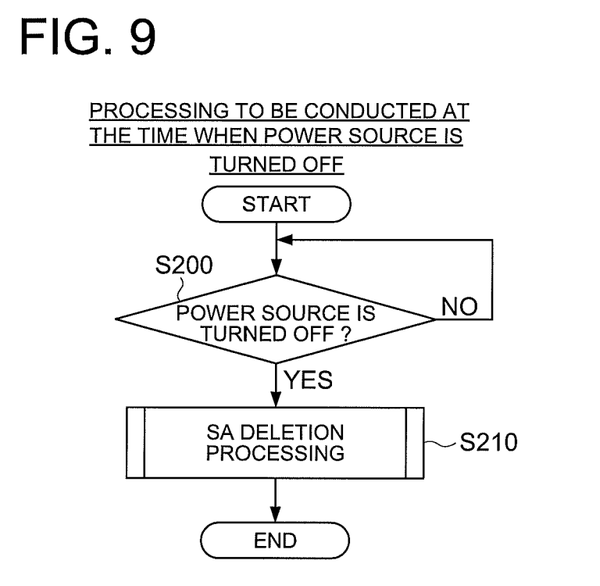
FIG. 9 shows a flowchart indicating still another operation procedure to be performed at the time when it is detected that a power source section is turned OFF, embodied in the present invention.

Initially, the power OFF detecting section 27 of the image forming apparatus 20 detects the power OFF sequence (Step S200 shown in FIG. 9). Successively, the power OFF detecting section 27 completes the SA deletion processing within a time interval until the power supply is actually stopped (for instance, a time interval until a head of the HDD has moved to its standby position, or when the cleaning section of the image outputting section 25 is in mid-course of its activation, a time interval until the cleaning has completed to some extent) (Step S210).

In this connection, since the image forming apparatus 20 is equipped with a mass-capacitance capacitor, the voltage level of the power supply does not abruptly lowered at the time when the power switch is turned OFF, but it takes some time in a range of several milliseconds to several seconds until the voltage level has reached to the operation halt voltage since the power switch has been turned OFF. Accordingly, it is possible to utilize the abovementioned time interval for implementing the SA deletion processing. Further, although the system is so constituted that the power OFF detecting section 27 conducts the SA deletion processing in the present embodiment, it is also applicable that the system is so constituted that the power OFF detecting section 27 requests the communication interface section 23 (NIC) to conduct the SA deletion processing.

Figure 10:
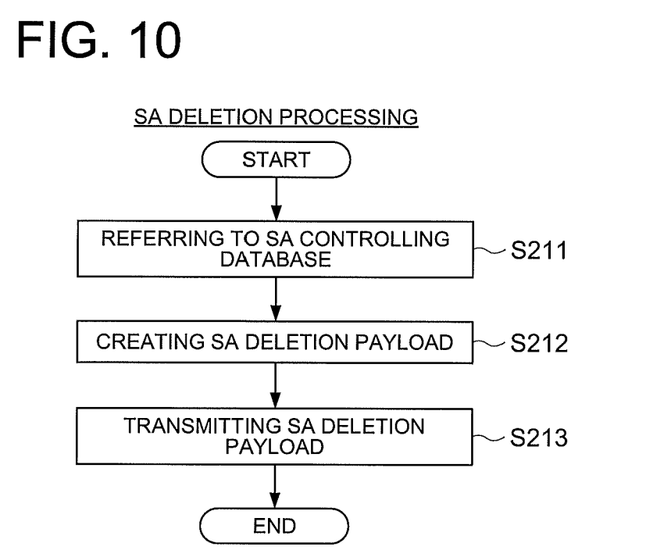
FIG. 10 shows a flowchart indicating yet another operation procedure of an SA deletion processing, embodied in the present invention.

Referring to the flowchart illustrated in FIG. 10, the SA deletion processing to be conducted in the abovementioned Step S210 will be detailed in the following.

Initially, the power OFF detecting section 27 (or the communication interface section 23) refers to the SA controlling database (Step S211), so as to create a SA deletion payload (Step S212). Successively, the power OFF detecting section 27 (or the communication interface section 23) transmits the above-created SA deletion payload to the destination site corresponding to the SA information registered. In this connection, the SA deletion command is transmitted as the deletion-payload notifying message, which is defined by the RFC (Request For Comment).

Further, in this connection, although the power-OFF detecting timing is defined as such the time when the power switch is turned OFF in the present embodiment, when the image forming apparatus 20 is not equipped with a mass-capacitance capacitor, it is also applicable that the power-OFF detecting timing is defined as such the timing at which the power OFF status can be predicted, such as the time when the power voltage is fell to a level equal to or lower than a predetermined threshold value, a timing of opening or closing the power switch cover, a time when the apparatus is rebooted due to the change of machine settings, a time when the operation for updating the firmware is completed, etc.

<Processing at the Time of Resuming IPsec Transmission (Processing in Lower Area of Sequential Diagram Shown in FIG. 5)>

When the power source of the image forming apparatus 20 is turned ON (or is rebooted), the IKE processing for exchanging the key of cryptograph between the image forming apparatus 20 and the server 10 is conducted again. Then, the SA information is registered into both the image forming apparatus 20 and the server 10, so as to resume the IPsec communication. Accordingly, it is possible to immediately restore the IPsec communication just after the operation for rebooting the image forming apparatus 20 is completed.

As described in the above, when detecting the power OFF sequence, the power OFF detecting section 27 sends the request for deleting the SA information to the server 10 during the time interval until the electric power supply is actually stopped. Accordingly, since the server 10 would not send useless packets to the image forming apparatus 20, it becomes possible to alleviate the processing burden of the server 10 and the traffic burden of the network concerned. In addition, since the IKE processing is performed just after the operation for rebooting the image forming apparatus 20 is completed, the IPsec communication can be effectively restored. Further, according to the configuration of the present embodiment, since the SA information is not stored in the nonvolatile storage medium provided in the image forming apparatus 20, it also becomes possible to secure the security aspect of the system concerned.

In this connection, although the controlling operations to be conducted by the image forming apparatus 20 have been described in the foregoing as the preferred embodiment of the present invention, the scope of the present invention is not limited to the aforementioned embodiment. The present invention is applicable to an arbitral network apparatus as well.

The present invention is applicable for a network apparatus that conducts a cryptographic communication, and a communication controlling method to be performed in the network apparatus concerned, for instance.

According to the exemplary embodiment of the present invention, the following effects can be attained.

According to the exemplary embodiment, when detecting the power OFF sequence, a network apparatus, which is currently exchanging cryptographic communication information so as to establish communication with an apparatus equipped in another party, based on the commonly owned information (or shared information), sends the request for deleting the cryptographic communication. information to the apparatus concerned, during the time interval until the electric power supply is actually stopped.

Therefore, since the apparatus equipped in the other party would not send useless packets to the network apparatus concerned, it becomes possible to alleviate the burden of the processing to be performed in the apparatus equipped in the other party associating with the cryptographic communication processing, and the traffic burden of the network concerned.

Further, since the cryptographic communication information would not be stored in the nonvolatile storage medium provided in the network apparatus concerned, it also becomes possible to prevent the security aspect of the system concerned from deteriorating.

Still further, since the communication is immediately re-established just after the rebooting operation of the network apparatus, whose power source had been once turned OFF, is completed, without waiting the time when the effective term of the cryptographic communication information has elapsed, it becomes possible to speedily restore the cryptographic communication. Yet further, since it becomes unnecessary to specify a network apparatus serving as the communication associate so as to notify the specified network apparatus of a malfunction message, it becomes possible to easily re-establish the cryptographic communication.

While the preferred embodiments of the present invention have been described using specific term, such description is for illustrative purpose only, and it is to be understood that changes and variations may be made without departing from the spirit and scope of the appended claims.

What is claimed is:

1. An image forming apparatus that communicates with a network apparatus through a network to exchange cryptographic communication information including an encryption key, so that each of the image forming apparatus and the network apparatus stores the cryptographic communication information therein to perform cryptographic communication therebetween, the image forming apparatus comprising:
a power source section to supply electric power so as to activate the image forming apparatus;
a communication interface section that is coupled to the network so as to transmit the cryptographic communication information to the network apparatus through the network; and
a power OFF detecting section to detect a power OFF sequence of the image forming apparatus;
wherein, in response to detection of the power OFF sequence by the power OFF detecting section, the communication interface transmits, to the network apparatus, a request for deleting the cryptographic communication information stored in the network apparatus, the request being transmitted before the power source section of the image forming apparatus is turned OFF; and
wherein the network apparatus deletes the cryptographic communication information stored in the network apparatus in response to the request for deleting the cryptographic communication information.

2. The first network apparatus of claim 1,
wherein the power OFF detecting section determines that the power OFF sequence is started when at least one of the following timings is detected:
a first timing when an NMI (Non Maskable Interrupt) signal is received;
a second timing when an output voltage of the power source section becomes equal to or lower than a prescribed threshold value;
a third timing when it is detected that a power switch cover is opened;
a forth timing when settings of the network apparatus are changed; and a fifth timing when an operation for rewriting a firmware of the network apparatus has completed.

3. The first network apparatus of claim 1, wherein the cryptographic communication is defined as an IPsec (Security Architecture for Internet Protocol) communication, while the cryptographic communication information is defined as SA (Security Association) information.

4. The first network apparatus of claim 1, wherein the request is issued by the power off detecting section in response to the detection of the power off sequence, and the communication interface transmits the request issued by the power off detecting section.

5. The first network apparatus of claim 1, wherein the power off detecting section makes the communication interface to issue the request and to transmit the issued request to the second network apparatus.

6. A communication controlling method for performing cryptographic communication in a network system, in which an image forming apparatus communicates with a network apparatus through a network to exchange cryptographic communication information including a key of cryptograph with the network apparatus, so that each of the image forming apparatus and the network apparatus stores the cryptographic communication information therein to perform the cryptographic communication therebetween, the communication controlling method comprising:
in response to detection of a power OFF sequence of the image forming apparatus, transmitting to the network apparatus, through the network, a request for deleting the cryptographic communication information stored in the network apparatus before a power source section of the image forming apparatus is turned OFF; and
implementing an operation for deleting the cryptographic communication information stored in the second network apparatus, according to the request transmitted in the transmitting step.

7. The communication controlling method of claim 6, wherein it is determined that the power OFF sequence is started in the transmitting step, when at least one of the following timings is detected:
a first timing when an NMI (Non Maskable Interrupt) signal is received;
a second timing when an output voltage of the power source section becomes equal to or lower than a threshold value established in advance;
a third timing when it is detected that a power switch cover is opened;
a forth timing when settings of the network apparatus are changed; and
a fifth timing when an operation for rewriting a firmware of the network apparatus has completed.

8. The communication controlling method of claim 6, wherein the cryptographic communication is defined as an IPsec (Security Architecture for Internet Protocol) communication, while the cryptographic communication information is defined as SA (Security Association) information.

9. A network system in which a network apparatus communicates with an image forming apparatus through a network to exchange cryptographic communication information including an encryption key, so that each of the network apparatus and the image forming apparatus stores the cryptographic communication information to perform cryptographic communication between the network apparatus and the image forming apparatus, the network system comprising:
the network apparatus;
the image forming apparatus which comprises:
a power source section to supply electric power so as to activate the image forming apparatus;
a communication interface section that is coupled to the network so as to transmit the cryptographic communication information to the network apparatus through the network; and
a power OFF detecting section to detect a power OFF sequence of the image forming apparatus;
wherein, in response to detection of the power OFF sequence by the power OFF detecting section, the communication interface of the image forming apparatus transmits, to the network apparatus, a request for deleting the cryptographic communication information stored in the network apparatus, the request being transmitted before the power source section of the image forming apparatus is turned OFF; and
wherein the network apparatus deletes the cryptographic communication information stored in the network apparatus in response to the request for deleting the cryptographic communication information transmitted from the image forming apparatus.

10. The network system of claim 9, wherein the power OFF detecting section of the image forming apparatus determines that the power OFF sequence is started when at least one of the following timings is detected:
a first timing when an NMI (Non Maskable Interrupt) signal is received;
a second timing when an output voltage of the power source section becomes equal to or lower than a prescribed threshold value;
a third timing when it is detected that a power switch cover is opened;
a forth timing when settings of the network apparatus are changed; and
a fifth timing when an operation for rewriting a firmware of the network apparatus has completed.

11. The network system of claim 9, wherein the cryptographic communication is defined as an IPsec (Security Architecture for Internet Protocol) communication, while the cryptographic communication information is defined as SA (Security Association) information.

12. The network system of claim 9, wherein the request is issued by the power OFF detecting section in response to the detection of the power off sequence, and the communication interface transmits the request issued by the power off detecting section.

13. The network system of claim 9, wherein the power OFF detecting section makes the communication interface issue the request and transmit the issued request to the second network apparatus.

* * * * *